United States Patent [19]

Klaren

[11] 4,304,753

[45] Dec. 8, 1981

[54] APPARATUS FOR PERFORMING PHYSICAL AND/OR CHEMICAL PROCESSES INVOLVING AT LEAST ONE LIQUID, E.G., A HEAT EXCHANGER

[75] Inventor: Dick G. Klaren, Hillegom, Netherlands

[73] Assignee: Esmil B.V., Amersfoort, Netherlands

[21] Appl. No.: 11,506

[22] Filed: Feb. 12, 1979

[30] Foreign Application Priority Data

Feb. 16, 1978 [NL] Netherlands ..................... 7801728

[51] Int. Cl.$^3$ ........................... B01J 8/20; B01J 8/24
[52] U.S. Cl. .................................. 422/140; 34/57 A; 165/104.16; 422/146; 422/202
[58] Field of Search .............................. 422/139-147; 34/57 A; 165/104 F, 104.16; 210/390, 181

[56] References Cited

U.S. PATENT DOCUMENTS 2,954,281  9/1960  Schutt ................................. 422/140
2,990,161  6/1961  Blaskowski ..................... 165/104 F
3,749,380  7/1973  Strom et al. ..................... 422/139 X

FOREIGN PATENT DOCUMENTS 2502354  7/1976  Fed. Rep. of Germany .
7306893  11/1973  Netherlands .

*Primary Examiner*—Michael S. Marcus
*Attorney, Agent, or Firm*—Stevens, Davis, Miller & Mosher

[57] ABSTRACT

Apparatus for performing physical and/or chemical processes involving at least one liquid, e.g. a heat exchanger, has a plurality of vertical tubes opening at their top and bottom ends into top and bottom chambers respectively. Particulate material in the tubes and the chambers is fluidized by the upward flow of liquid in the tubes. To prevent inefficient circulatory flow of the particles caused by downward movement of the particles in one or more of the tubes, there is provided, in at least one of the top and bottom chambers, means for hindering the transverse movement of the particles in the chamber. Such means may be loose balls made of wire mesh of a size large enough to allow passage of particles through the ball under normal conditions.

6 Claims, 1 Drawing Figure

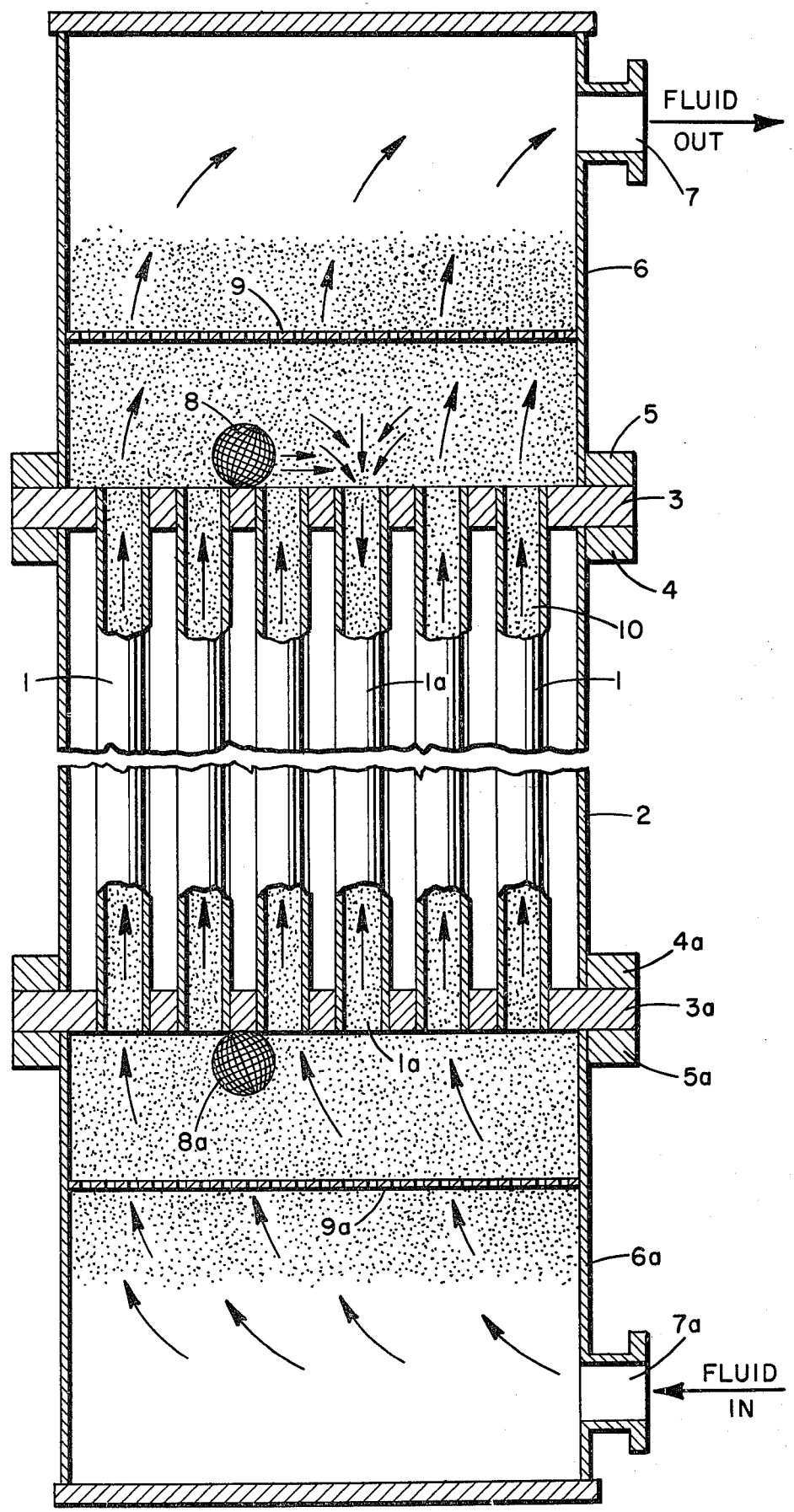

APPARATUS FOR PERFORMING PHYSICAL AND/OR CHEMICAL PROCESSES INVOLVING AT LEAST ONE LIQUID, E.G., A HEAT EXCHANGER

BACKGROUND OF THE INVENTION

1. Field of the Invention

The invention relates to apparatus for performing physical and/or chemical processes involving at least one liquid, and is particularly applicable to heat exchangers. In the apparatus, a liquid flows upwardly through parallel vertical tubes containing a mass of particles fluidised by the liquid. 2. Description of the Prior Art An example of apparatus of this kind is described in U.S. Pat. No. 2,919,118. It is in principle possible to design and construct such apparatus so that a stable operational condition is maintained during operation. What is to be understood here by "a stable operational condition" is one in which the movement of the particles in the parallel tubes is substantially uniform, as between the different tubes. Nevertheless, it can happen that circulation of particles occurs within the assembly of tubes, for instance with careless operation and in particular if care is not taken when starting up the installation. Circulation of the particles is the state when in one or several tubes upward transport of the particles takes place, while in one or several other tubes, downward movement of the particles occurs. The path of circulation is closed by the top and bottom chambers.

If after careless starting, the fluidised particles in some tubes reach the top chamber before those in other tubes, particles originating from the former tubes will flow via the top chamber into adjacent tubes which are not yet quite filled with the fluidised particles. The result is a disturbance of the pressure balance among the tubes themselves, which causes circulation. If the apparatus is extensively used, this circulation of the particulate mass is undesirable. For example, if the apparatus is used as a heat exchanger, the efficiency of heat exchange decreases when circulation flows occur, because the temperature difference causing the heat transfer via the pipe walls is reduced. Consequently, a larger heated surface is required for the transfer of a given quantity of heat.

SUMMARY OF THE INVENTION

The object of the invention is to provide apparatus of the type described initially in which circulation flow is inhibited or rapidly damped after it begins. In particular, therefore, the invention aims to provide a heat exchanger of high efficiency.

According to the invention there is provided apparatus for performing physical and/or chemical processes involving at least one liquid, comprising a plurality of parallel vertically extending tubes which are mounted at their upper and lower ends in respective pipe plates at which the tubes open into respectively a top chamber and a bottom chamber, the apparatus containing a mass of particles which, as a result of upward passage of liquid in the tubes, fluidizes and fills the tubes and at least part of the boxes. The improvement provided by the invention is that the top chamber and/or the bottom chamber is provided with means which during operation hinder movement of the said particles from one tube end to another tube end within the chamber, thereby inhibiting circulatory flow of the particles up one tube and down another tube.

In the simplest embodiment such means for hindering movement of the particles can consist of vertical gauze walls in the top and/or bottom chamber between the tube ends. It is alternatively conceivable to cover each tube with a wide-meshed gauze.

A notable improvement, however, can be achieved if said means hindering movement of said particles comprises at least one element which is freely movable transversely in the chamber, so that the element is carried by flow of the particles towards a tube in which downward flow of particles occurs. Preferably, said movable element has apertures through it of a size sufficient to allow the particles to pass through the element. Should circulation flow occur, causing for instance above the top tube plate a migration of particles to the tubes in which the particles are flowing downwards, the movable elements will move towards the openings of these tubes. Thus the tube openings are fully or partly closed to the flow of particles without much impediment to the liquid flow. Quite often bridge formation may even occur in the particle mass against or in the movable element, so that the movement of particles into the tubes concerned is completely cut off. The result is that the pressure balance in the tube with downward particle movement is redressed, after which this tube can refill gradually with a stable fluidised bed along its entire length.

Although it is possible to achieve some effect if the movable elements can move during operation in all directions within the fluidised particle mass in the top or bottom chamber, best results can be achieved if these movable elements remain in contact with the tube plates. Preferably therefore the weight of the said movable element is such that, under fluidised flow conditions, it remains substantially in contact with the tube plate or the tube ends of the chamber. This implies that the movable elements must be heavier than the fluidised mass in the top chamber, whereas they must be lighter in the bottom chamber.

Bodies in a variety of shapes can be chosen as the movable elements, while their mobility can also be varied to suit particular cases. For instance the connection of the movable elements to the tube plates can either be movable or not. Extremely satisfactory results have been achieved if the movable elements are loose balls with a diameter larger than the inside diameter of any of the tubes. During operation, these balls can move freely to each tube in which the particles are flowing downwardly. Preferably the balls are hollow, and have foraminate, e.g. mesh walls. The balls should be permeable to stably fluidised particles and should not significantly hamper the process of fluidisation at the supply and discharge ends of the tubes. In normal operation, the balls will move haphazardly across the tube plate in for instance the top chamber without affecting the fluidisation of the layer of particles in the chamber. However, as soon as the stable condition is disturbed, the ball nearest to a tube in which the particle mass is flowing downwards will be drawn towards this tube by the flow of particles towards it. The tube will be blocked by the ball moving towards it, so that it can resume stable operation.

In fact in this way a dynamic correction of the circulation phenomenon is achieved. By applying corrections exclusively in respect of the flow behaviour of the particles in those pipes in which they move in an opposite direction to the movement in the remainder of the tubes, the flow in all the pipes is stabilised.

The balls can have various designs. The preferred material is metal gauze.

Good results can be achieved by providing these balls either only in the bottom chamber or only in the top chamber, but a quicker and more effective way to achieve stabilisation is to provide the foraminate balls in both chambers.

Preferably the movable element is confined between the tube plate of the chamber and a transverse wall in the chamber which is spaced from the tube plate and is permeable to the particles. If this transverse wall is at a distance of 1 to 6 times the ball diameter from the tube plate, the movement of the particles towards a tube with differing behaviour has been found to be enhanced. The result of this is that the movable elements (i.e. the perforated balls) move more quickly towards this tube, so that prompter and more effective correction is brought about.

The transverse wall can be of metal gauze or it can be a perforated plate. It is however also possible to design this wall as a layer of packed filling material, which is kept in its place by compressing it between meshes or plates with very wide mesh size or large perforations respectively. Thus the particle fluidisation can continue into and through this layer of packed filling material. Since in this case larger openings between the packed filling material can suffice than when using only a mesh or a perforated plate, the risk of this wall being clogged is reduced.

BRIEF INTRODUCTION OF THE DRAWING

A preferred embodiment of the invention will now be described by way of example only with reference to the accompanying diagrammatic drawing, in which the single FIGURE is a side view of the top of the apparatus. The bottom of this apparatus is in principle the mirror image of the top end.

DESCRIPTION OF THE PREFERRED EMBODIMENT

A plurality of vertical parallel pipes or tubes 1 are provided within a drum 2. Their top ends are fastened into a tube plate 3. Their bottom ends are fastened into a tube plate 3a. The tube plates 3 and 3a and the wall of the drum 2 are connected to each other by means of flanges 4 and 4a, respectively. A flange 5 is fastened to the plate 3 and is attached to the wall of the top chamber 6. A flange 5a is fastened to the plate 3a and is attached to the wall of the bottom chamber 6a. In operation liquid is introduced into inlet 7a and passes upwardly through the tubes 1 and a mass 10 of particles in these tubes 1 and in the top chamber 6 and the bottom chamber 6a is fluidized. The liquid is discharged via discharge opening 7.

The FIGURE illustrates the condition in which in one of the tubes 1a the particles are flowing downwardly. In one or more of the other tubes, the particles move upwardly, resulting in circulation flow of the particles.

A number of balls 8 are lying on the tube plate 3, only one ball being shown in the drawing. The balls 8 have a diameter which is larger than the inside diameter of the tubes 1, but which on the other hand is such that two balls may lie unimpeded on two adjacent tubes 1.

The balls are made of metal gauze, the mesh size of which is chosen so much larger than the particle size that during stable operation the movement of the particles is scarcely impeded by the balls 8. However, if the illustrated downward movement of the particulate mass sets in in tube 1a, the nearest ball 8 will as a result move along with the particles until it covers the opening of the tube 1a. The accelerated movement of particles to this opening now gives rise to bridge formation against the mesh of the ball 8, the result of which is that the condition in the tube 1a can stabilize.

The weight of each ball 8 is chosen so that it remains lying continuously on the tube plate 3 during operation. It will be clear that balls 8a in the bottom chamber must be so much lighter that they float against the bottom tube plate 3a.

At a fixed distance above the tube plate 3, and below tube plate 3a are mesh or gauzes 9, and 9a, respectively which have a mesh width amply sufficient to allow the particles to pass freely during stable operation. Nevertheless, in the event of circulation of the particles, this gauze can enhance the movement of the particles eg to the inlet opening of the tube 1a, in which the particles are moving downwardly. This is because the movement of particles from above the gauze to the opening of the tube 1a is retarded, so that beneath the gauze 9 and above the tube 1a a vortex can form in the particle mass. Consequently the ball 8 is moved towards the tube 1a speedily. The gauze 9 can be replaced either by a perforated plate, or by a layer of packed filling material which is pressed between wide-meshed gauzes.

While the invention has been illustrated above by reference to the preferred embodiment, it will be understood by those skilled in the art that various changes may be made without departing from the spirit and scope of the invention and it is intended to cover all such changes and modifications by the appended claims.

What is claimed is:

1. In apparatus for performing physical and/or chemical processes involving at least one liquid, comprising a drum, pipe plates, a top and bottom chamber mounted on each end of said drum and having a fluid outlet and inlet respectively, a plurality of parallel vertically extending tubes which pass through said drum and are mounted at their upper and lower ends in said respective pipe plates at which the tubes open into respectively said top chamber and said bottom chamber and a mass of particles which, as a result of upward passage of liquid in the tubes, fluidizes and fills the tubes and at least part of the chambers, the improvement that at least one of the top chamber and bottom chamber is provided with means which during operation hinder movement of the said particles from one tube end to another tube end within the chamber, thereby inhibiting circulatory flow of the particles up one tube and down another tube, said means hindering movement of said particles comprising at least one element which is freely movable transversely in the chamber, so that the element is carried by flow of the particles towards a tube in which the flow of particles is away from the chamber.

2. Apparatus according to claim 1 wherein said movable element has apertures through it of a size sufficient to allow the particles to pass through the element.

3. Apparatus according to claim 1 or claim 2 wherein the weight of the said movable element is such that, under fluidized flow conditions, it remains substantially in contact with the tube plate or the tube ends of the chamber.

4. Apparatus according to claim 1 wherein said movable element is a loose ball with a diameter greater than the inside diameter of any of the tubes.

5. Apparatus according to claim 4 wherein said ball is hollow and has a foraminate outer wall.

6. Apparatus according to any one of claims 1, 2 and 4 wherein the movable element is confined between the tube plate of the chamber and a transverse wall in the chamber which is spaced from the tube plate and is permeable to the particles.

* * * * *